United States Patent
Doan et al.

(10) Patent No.: US 9,250,888 B2
(45) Date of Patent: Feb. 2, 2016

(54) MIGRATION PACKAGE FOR UPDATING MULTIPLE SOFTWARE PRODUCTS

(71) Applicants: Christopher H. Doan, Austin, TX (US); Kent F. Hayes, Jr., Chapel Hill, NC (US); Shelley T. Yang, Chapel Hill, NC (US)

(72) Inventors: Christopher H. Doan, Austin, TX (US); Kent F. Hayes, Jr., Chapel Hill, NC (US); Shelley T. Yang, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 13/686,393

(22) Filed: Nov. 27, 2012

(65) Prior Publication Data

US 2014/0149975 A1    May 29, 2014

(51) Int. Cl.
*G06F 9/44* (2006.01)
*G06F 9/445* (2006.01)

(52) U.S. Cl.
CPC .. *G06F 8/65* (2013.01); *G06F 8/63* (2013.01); *G06F 8/61* (2013.01)

(58) Field of Classification Search
None
See application file for complete search history.

(56) References Cited

U.S. PATENT DOCUMENTS

| | | | |
|---|---|---|---|
| 5,978,916 A | 11/1999 | Randall | |
| 6,282,711 B1 * | 8/2001 | Halpern | G06F 8/61 709/203 |
| 7,552,431 B2 | 6/2009 | Napier et al. | |
| 2006/0112152 A1 | 5/2006 | Napier et al. | |
| 2011/0289499 A1 * | 11/2011 | Haubold | G06F 8/65 717/173 |

* cited by examiner

*Primary Examiner* — Don Wong
*Assistant Examiner* — Deric Ortiz
(74) *Attorney, Agent, or Firm* — Russell Ng PLLC; Thomas Tyson

(57) ABSTRACT

A first page collection archive of user interface pages of a first software application program and a second page collection archive of user interface pages of a second software application program are stored in a repository of a data processing system. A processor generates a first difference file including user interface pages within a current collection of user interface pages that are not included within the first page collection archive, and further generates a second difference file including user interface pages within a current collection of user interface pages that are not included within the second page collection archive. The processor creates a compound installation image including the first difference file and the second difference file and stores the compound installation image in a data storage device for subsequent installation on a client device.

12 Claims, 4 Drawing Sheets

MIGRATION PACKAGE FOR UPDATING MULTIPLE SOFTWARE PRODUCTS

BACKGROUND OF THE INVENTION

The present invention relates to data processing, and more particularly, to updating multiple software products.

Over its installed lifetime, a typical software application program will be updated numerous times. The updates can be unscheduled, for example, to apply bug fixes and/or to address security vulnerabilities, or scheduled, for example, to provide enhanced functionality in accordance with a development roadmap or to provide daily, monthly and/or annual updates to data employed by the software application program. Although a computer system typically has a large number of installed software application programs, the update(s) for each software application program are packaged separately.

Because not all computer systems on which software application programs are installed are updated concurrently, it is typical, even within a given enterprise, to have different computer systems at various states of update progress. For example, a first target computer system may have all updates installed for a particular software application program, a second target computer system may have all but the latest update, and a third target computer system may have all by the last two updates installed, etc. Further complicating the update process, the software application program can also be under constant development, meaning that, even for a given target computer system, the update required to bring the target computer system to a current state can be constantly changing.

BRIEF SUMMARY

In some embodiments, a first page collection archive of user interface pages of a first software application program and a second page collection archive of user interface pages of a second software application program are stored in a repository of a data processing system. A processor generates a first difference file including user interface pages within a current collection of user interface pages that are not included within the first page collection archive, and further generates a second difference file including user interface pages within a current collection of user interface pages that are not included within the second page collection archive. The processor creates a compound installation image including the first difference file and the second difference file and stores the compound installation image in a data storage device for subsequent installation on a client device.

DETAILED DESCRIPTION

Figure 1:
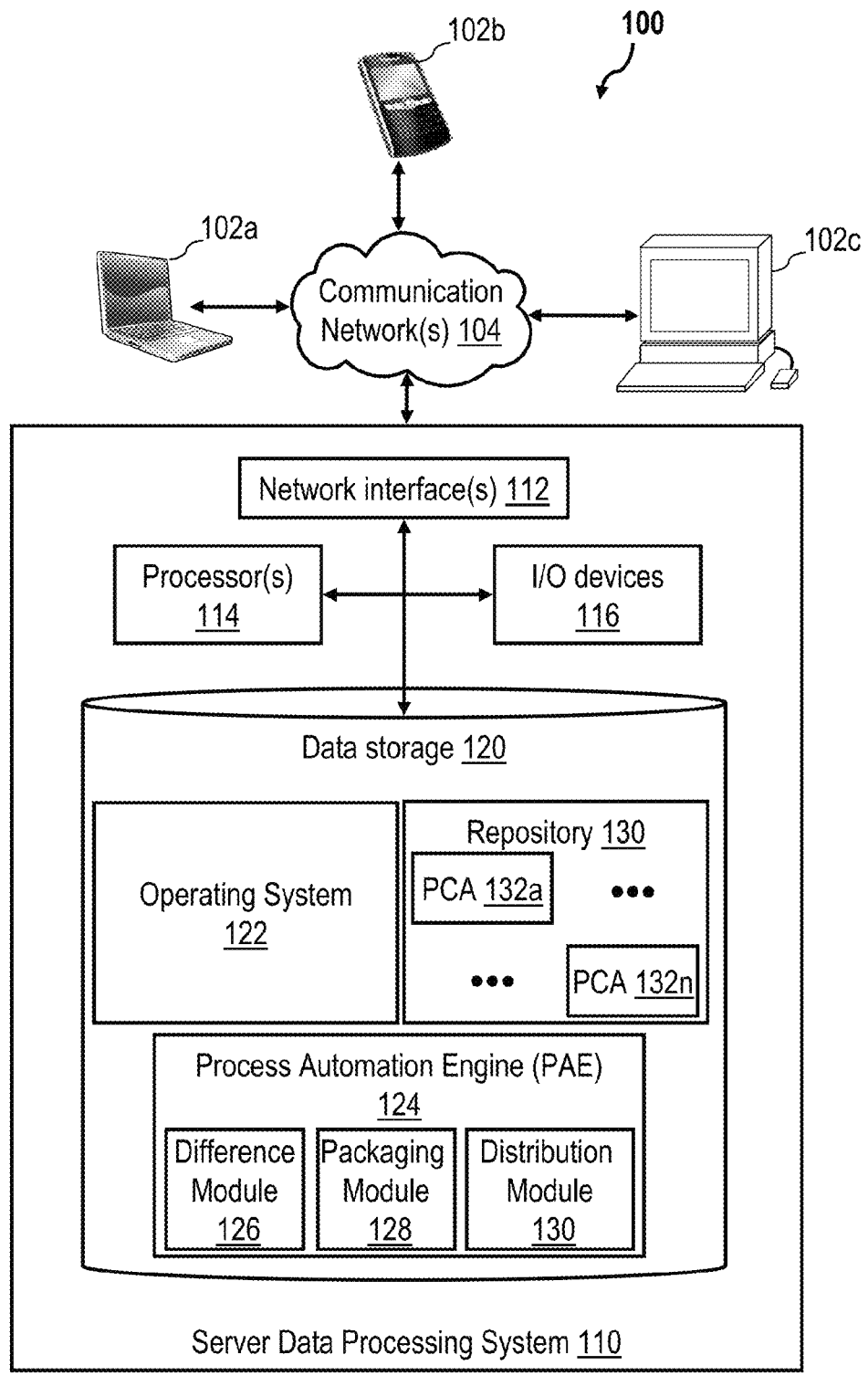
FIG. 1 is a high level block diagram of a data processing environment in accordance with one embodiment.

With reference now to the figures and with particular reference to FIG. 1, there is illustrated a high level block diagram of an exemplary data processing environment 100 in accordance with one embodiment. As shown, exemplary data processing environment 100 includes a server data processing system 110 coupled for communication to one or more circuit-switched or packet-switched communication networks 104, such as wired or wireless local area or wide area network(s), cellular telephony network(s), and/or public switched telephone network(s) (PSTNs). Also coupled to communication network(s) 104 are one or more client devices 102a-102c, such as computer systems, mobile telephones, smart phones, tablets, set top boxes, televisions, digital video recorders (DVRs), which are capable of executing one or more software application programs. As described further below, server data processing system 110 communicates software application program updates to client devices 102 via communication network(s) 104. The communication between devices 102-102c and data processing system 110 can employ one or more communication protocols, including, for example, Transport Control Protocol/Internet Protocol (TCP/IP), instant messaging, Simple Mail Transport Protocol (SMTP) and/or Hypertext Transfer Protocol (HTTP).

Still referring to FIG. 1, server data processing system 110, which can include one or more physical data processing devices, includes one or more network interfaces 112 that permit data processing system 110 to communicate via communication networks 104. Server data processing system 110 additionally includes one or more processors 114 that execute program code, for example, in order to prepare updates for software application programs and distribute those updates to client devices 102. Data processing system 110 may also include input/output (I/O) devices 116, such as a display, keyboard, pointing device, and optionally other attached devices, which receive inputs and provide outputs of the processing performed by server data processing system 110. Finally, server data processing system 110 includes data storage 120, which may include one or more volatile or non-volatile storage devices, including memories, solid state drives, optical or magnetic disk drives, tape drives, etc.

Data storage 120 stores data and program code, which can be processed and/or executed by processor(s) 114 to prepare updates for software application programs and distribute those updates to client devices 102. In the depicted embodiment, the data and program code stored by data storage 120 of server data processing system 110 includes operating system 122, which controls server data processing system 110 and provides interfaces through which other program code can access basic services, such as data communication, user interface, access to data storage 120, etc. For example, operating system 122 can be one of the commercially available Windows®, LINUX®, UNIX®, Android™, iPhone OS, BlackBerry OS, or AIX® operating systems.

Data storage 120 additionally includes a process automation engine (PAE) 124 that, in one embodiment, provides a number of functions, including IT (information technology) asset lifecycle management, IT workflow development, IT configuration and release management, IT self-help services, and IT service request management. PAE 124 includes a difference module 126, packaging module 128 and distribution module 130 utilized to prepare and distribute updates for software application programs as described further below with reference to FIGS. 2-3. PAE 124 also maintains a repository 130 that stores a respective archive of updatable content for each of multiple different software application programs updated by PAE 124. In the particular embodiment shown in FIG. 1 in which the updatable content comprises user interface (UI) pages, archived UI pages for a first software application program are stored in page content archive 132a, and archived UI pages for an $n^{th}$ software application program are stored in page content archive 132$n$.

Although not explicitly illustrated in FIG. 1, it should be appreciated that each of client devices 102$a$-102$c$ may have the same general architecture as server data processing system 110, and may therefore include one or more network interfaces, one or more processors, one or more I/O devices, and data storage.

Figure 2:
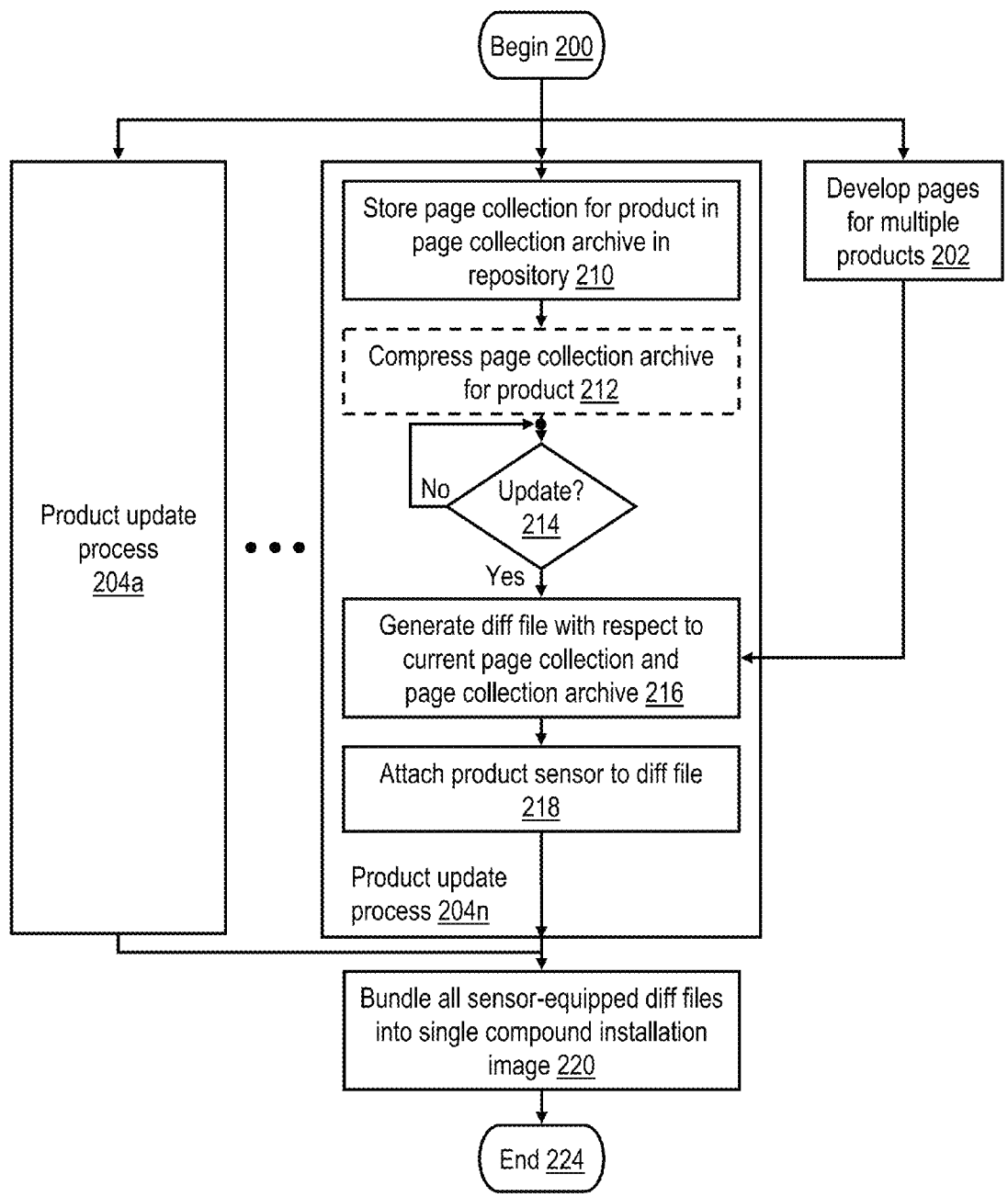
FIG. 2 is a high level logical flowchart of an exemplary update process by which updates for multiple software application programs are packaged into a single compound installation image in one embodiment.

Referring now to FIG. 2, there is depicted a high level logical flowchart of an exemplary update process by which updates for multiple software application programs are packaged into a single compound installation image in one embodiment. For clarity, the flowchart is described with additional reference to the exemplary data processing environment depicted in FIG. 1 and the data flow diagram illustrated in FIG. 3. The exemplary update process shown in FIG. 2 can be performed, for example, by PAE 124 of FIG. 1. It should be appreciated that, as a logical rather than chronological flowchart, one or more of illustrated steps can, in some embodiments, be performed in a different order than illustrated or concurrently.

The update process illustrated in FIG. 2 begins at block 200 and thereafter proceeds in parallel to each of blocks 202 and 204$a$-204$n$. At block 202, content for multiple different software application programs, including, for example, UI pages, is developed, preferably using PAE 124, but possibly utilizing one or more alternative or additional software development packages. Thus, block 202 represents the development of the multiple different software application programs, each according to its own development process and/or schedule. Each of the multiple different software applications thus has its own current content, including, for example, a current collection of UI pages. During the development of the multiple different software application programs, each of the multiple different software application programs is also updated, according to its own development process and/or schedule or as needed, by a respective one of product updates processes 204$a$-204$n$.

Figure 3:
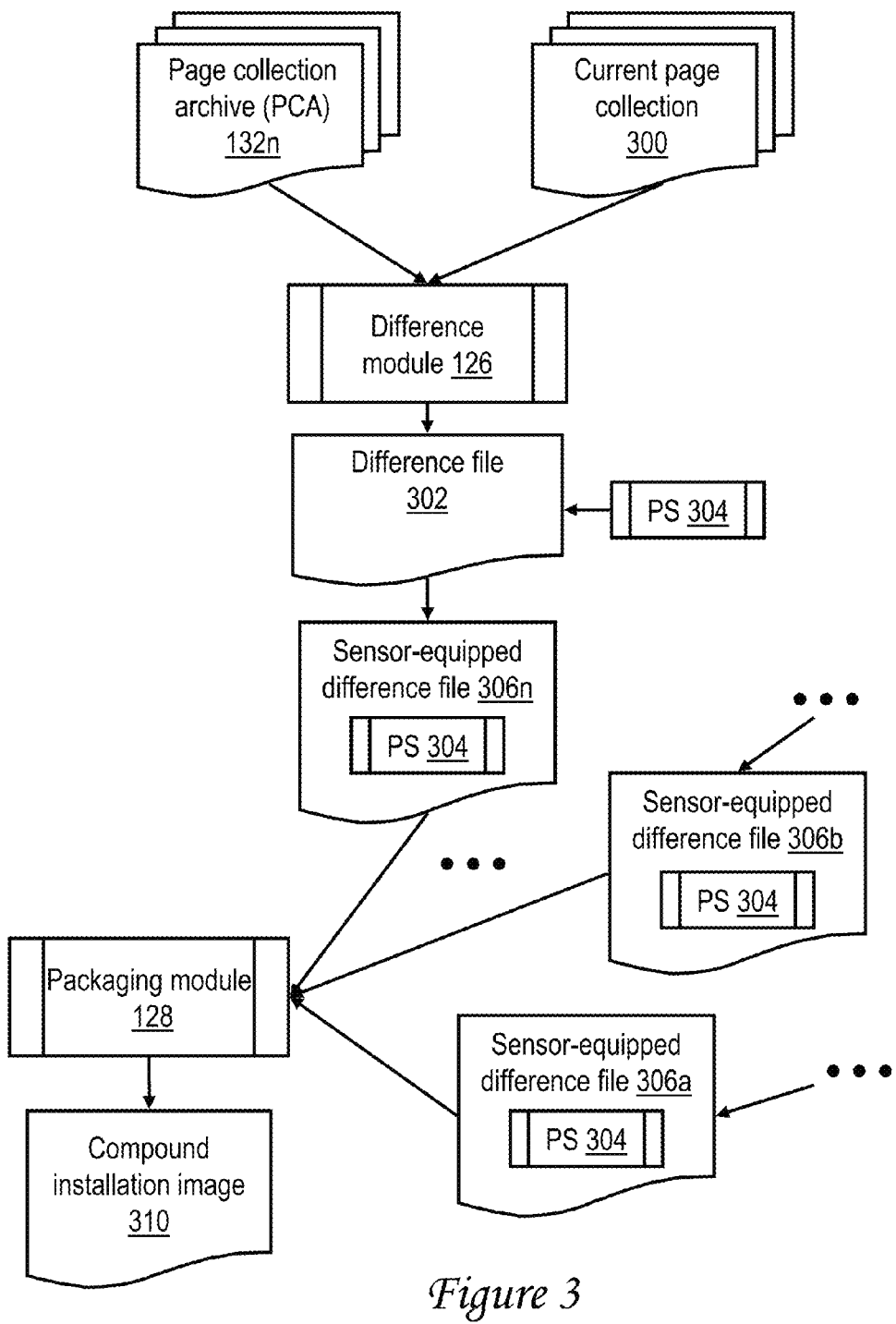
FIG. 3 is a data flow diagram of the update process shown in FIG. 2.

As shown in detail for product update process 204$n$, a product update process includes PAE 124 or another software development package archiving in repository 130 updatable content for a respective one of multiple different software application programs updated by PAE 124. The archived updatable content is illustrated in FIGS. 1 and 3 as PCA 132$n$. As indicated at block 212, PCA 132$n$ is optionally but preferably compressed, for example, in a zip file format. The compression can be performed by PAE 124 or by another software program, such as a software development package.

At block 214. PAE 124 determines whether or not an update to the software application program associated with product update process 204$n$ should be distributed to client devices one or more of client devices 102$a$-102$c$. As will be appreciated, the decision depicted at block 214 can be made utilizing either a pull methodology in which one of client devices 102$a$-102$c$ requests the update or a push methodology in which PAE 124 determines to make an update independent of a client request (e.g., on a predetermined schedule, in response to a development milestone, in response to discovered security vulnerability, etc.). In response to a determination to make an update at block 214, PAE 124 utilizes difference module 126 to generate a difference (diff) file 302 representing a difference between archived updatable content of the software program application in repository 130 (e.g., PCA 132$n$) and the current updatable content (e.g., current page collection 300) of the software program application from the development process depicted at block 202 (block 216). Thus, for example, if PCA 132$n$ contains all UI pages in current page collection 300 except for the most recent seven UI pages of current page collection 300, difference file 302 contains only those most recent seven UI pages.

As shown at block 218, PAE 124 then embeds a product sensor 304 in diff file 302 to obtain a sensor-equipped difference file 306$n$. Product sensor 304 is a compact executable that, when executed on a client device 102 receiving an update, determines one or more units of the updatable content present in sensor-equipped difference file 306$n$ that are not installed on that client device 102. As indicated at block 220 of FIG. 2 as well as in FIG. 3, PAE 124 utilizes packaging module 128 to package sensor-equipped difference file 306$n$ together with the sensor-equipped difference files 306$a$, 306$b$, etc. generated by the other product update processes 204 into a single self-executing compound installation image 310. Compound installation image 310 thus includes updates of multiple different software application programs. Following block 220, the process depicted in FIG. 2 ends at block 224. Thereafter, PAE 124 may utilize distribution module 130 to distribute compound installation image 310 to one or more of client devices 102$a$-102$c$. In connection with the distribution of compound installation image 310, PAE 124 typically stores the compound installation image 310, either within its data storage 120, in data storage of one or more of client devices 102 or in another data storage device coupled to server data processing system 110 via network interface(s) 112.

Figure 4:
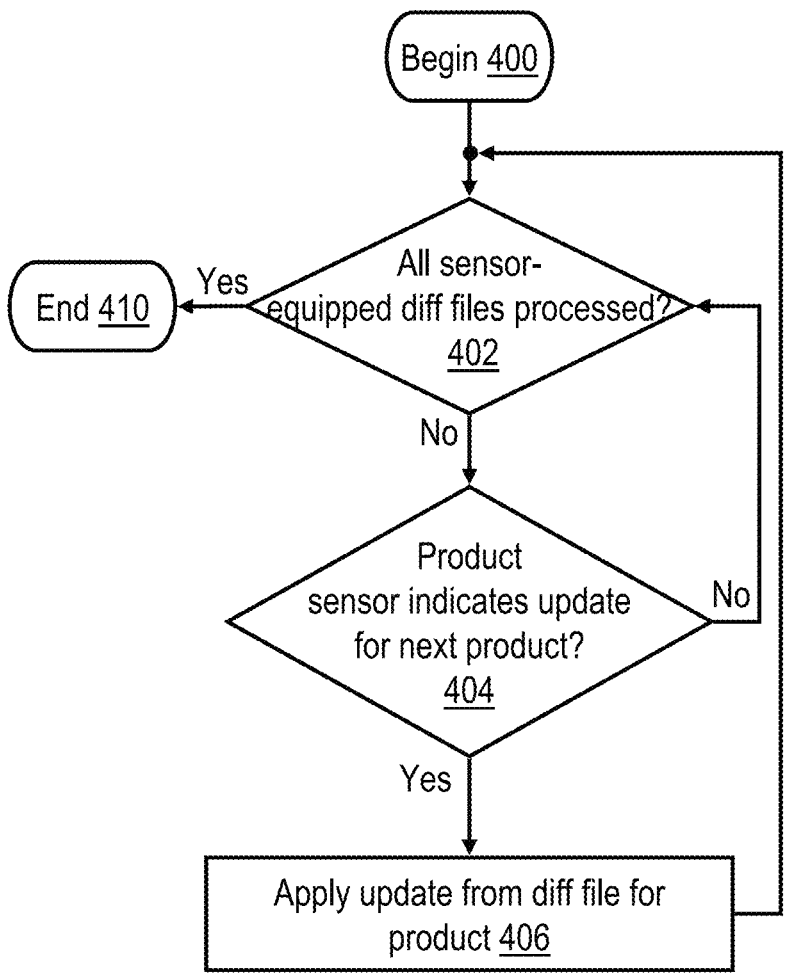
FIG. 4 is a high level logical flowchart of an exemplary process by which multiple different software application programs installed on a client device are updated in one embodiment.

Referring now to FIG. 4, there is depicted a high level logical flowchart of an exemplary process by which multiple different software application programs installed on a client device are updated in one embodiment. The process begins at block 400, for example, in response to execution on a client device 102 of compound installation image 310 delivered to that client device by distribution module 130 of PAE 124. The process proceeds from block 400 to block 402, which illustrates compound installation image 310 determining whether or not all sensor-equipped diff files 306 within compound installation image 310 have been processed. If so, the process illustrated in FIG. 4 terminates at block 410. If not, the process proceeds to block 404.

Block 404 represents the product sensor 304 embedded in the next sensor-equipped difference file 306 executing to determine whether or not to install an update for the software application program associated with the sensor-equipped difference file 306. Product sensor 304 may make the determination illustrated at block 404, for example, by determining whether the associated software application program is installed on client device 102, and if so, whether or not the software application program includes all updatable content contained in sensor-equipped difference file 306 (e.g., all of the UI pages). In response to a determination that the associated software application program is not installed on the client device 102 or in response to a determination that the software application program includes all updatable content contained in sensor-equipped difference file 306, the process returns to block 402, which represents the processing of the next sensor-equipped difference file 306, if any, in compound installation image 310. If, however, product sensor 304 of the sensor-equipped difference file 306 under processing determines at block 404 that an update of the associated software application program is to be performed, compound installation image 310 updates the associated software application program with the updatable content (e.g., UI pages) from the sensor-equipped difference file 306. The process returns from block 406 to block 402, which has been described.

As has been described, in some embodiments, a first page collection archive of user interface pages of a first software application program and a second page collection archive of user interface pages of a second software application program are stored in a repository of a data processing system. A processor generates a first difference file including user interface pages within a current collection of user interface pages that are not included within the first page collection archive, and further generates a second difference file including user interface pages within a current collection of user interface pages that are not included within the second page collection archive. The processor creates a compound installation image including the first difference file and the second difference file and stores the compound installation image in a data storage device for subsequent installation on a client device.

While the present invention has been particularly shown as described with reference to one or more preferred embodiments, it will be understood by those skilled in the art that various changes in form and detail may be made therein without departing from the spirit and scope of the invention. For example, although aspects have been described with respect to a computer system executing program code that directs the functions of the present invention, it should be understood that present invention may alternatively be implemented as a program product including a data storage medium (device) (e.g., a dynamic or static memory, solid state drive, magnetic or optical disk, magnetic tape, etc.) storing program code that can be processed by a data processing system to cause the data processing system to perform those functions.

What is claimed is:

1. A method of integrating updates for multiple different software application programs, the method comprising:
    storing, in a repository of a data processing system, a first page collection archive of user interface pages of a first software application program and a second page collection archive of user interface pages of a second software application program;
    a processor generating a first difference file including user interface pages within a current collection of user interface pages that are not included within the first page collection archive;
    the processor embedding, within the first difference file, a first product sensor, wherein the first product sensor is an executable that determines whether to update an installation of the first software application program;
    the processor generating a second difference file including user interface pages within a current collection of user interface pages that are not included within the second page collection archive;
    the processor embedding, within the second difference file, a second product sensor, wherein the second product sensor is an executable that determines whether to update an installation of the second software application program;
    the processor creating a compound installation image including the first difference file and the second difference file; and
    storing the compound installation image in a data storage device.

2. The method of claim 1, and further comprising:
    compressing the first and second page collection archives, wherein the storing includes storing compressed first and second page collection archives in the repository.

3. The method of claim 1, and further comprising the data processing system distributing the compound installation image to at least one other data processing system.

4. The method of claim 1, and further comprising:
    the data processing system distributing the compound installation image to another data processing system;
    installing user interface pages from the first difference file on said another data processing system in response to the first product sensor determining to update the installation of the first software application program on said another data processing system; and
    installing user interface pages from the second difference file on said another data processing system in response to the second product sensor determining to update the installation of the second software application program on said another data processing system.

5. A data processing system, comprising:
    a processor; and
    data storage coupled to the processor, the data storage including a repository and program code that, when executed by the processor, causes the data processing system to perform:
        storing, in the repository of the data processing system, a first page collection archive of user interface pages of a first software application program and a second page collection archive of user interface pages of a second software application program;
        generating a first difference file including user interface pages within a current collection of user interface pages that are not included within the first page collection archive;
        embedding, within the first difference file, a first product sensor, wherein the first product sensor is an executable that determines whether to update an installation of the first software application program;
        generating a second difference file including user interface pages within a current collection of user interface pages that are not included within the second page collection archive;
        embedding, within the second difference file, a second product sensor, wherein the second product sensor is an executable that determines whether to update an installation of the second software application program;
        creating a compound installation image including the first difference file and the second difference file; and
        storing the compound installation image in a data storage device.

6. The data processing system of claim 5, wherein the program code, when executed by the processor, causes the data processing system to perform:
    compressing the first and second page collection archives, wherein the storing includes storing compressed first and second page collection archives in the repository.

7. The data processing system of claim 5, wherein the program code, when executed by the processor, causes the data processing system to perform:
    distributing the compound installation image to at least one other data processing system.

8. A program product comprising:
    a computer-readable storage device; and
    program code that, when executed by a processor of a data processing system, causes the data processing system to perform:
        storing, in a repository of the data processing system, a first page collection archive of user interface pages of a first software application program and a second page collection archive of user interface pages of a second software application program;

generating a first difference file including user interface pages within a current collection of user interface pages that are not included within the first page collection archive;

embedding, within the first difference file, a first product sensor, wherein the first product sensor is an executable that determines whether to update an installation of the first software application program;

generating a second difference file including user interface pages within a current collection of user interface pages that are not included within the second page collection archive;

embedding, within the second difference file, a second product sensor, wherein the second product sensor is an executable that determines whether to update an installation of the second software application program;

creating a compound installation image including the first difference file and the second difference file; and storing the compound installation image in a data storage device.

9. The program product of claim 8, wherein the program code, when executed by the processor, causes the data processing system to perform:

compressing the first and second page collection archives, wherein the storing includes storing compressed first and second page collection archives in the repository.

10. The program product of claim 8, wherein the program code, when executed by the processor, causes the data processing system to perform:

distributing the compound installation image to at least one other data processing system.

11. A program product comprising:

a computer-readable storage device; and a self-executing compound installation image stored on the computer-readable storage medium, wherein the compound installation image includes:

a first difference file including user interface pages within a current collection of user interface pages that are not included within a first page collection archive for a first software application program, wherein the first difference file includes a product sensor that is an executable that determines whether to update an installation of the first software application program;

a second difference file including user interface pages within a current collection of user interface pages that are not included within a second page collection archive for a different second software application program, wherein the second difference file includes a product sensor that is an executable that determines whether to update an installation of the second software application program;

wherein the self-executing compound installation image, when executed on a data processing system, causes the data processing system to install user interface pages from the first difference file on said data processing system in response to the first product sensor determining to update the installation of the first software application program; and wherein the self-executing compound installation image, when executed on the data processing system, causes the data processing system to install user interface pages from the second difference file on said data processing system in response to the second product sensor determining to update the installation of the second software application program.

12. The program product of claim 11, wherein:

the product sensor of the first difference file determines to update the installation of the first software application program by determining whether the first software application program is installed on the data processing system and by determining whether or not the first application program includes all user interface pages in the first difference file; and the product sensor of the second difference file determines to update the installation of the second software application program by determining whether the second software application program is installed on the data processing system and by determining whether or not the second application program includes all user interface pages in the second difference file.

\* \* \* \* \*